Aug. 11, 1925. 1,549,108
C. GIRL
BUMPER
Filed Nov. 23, 1922
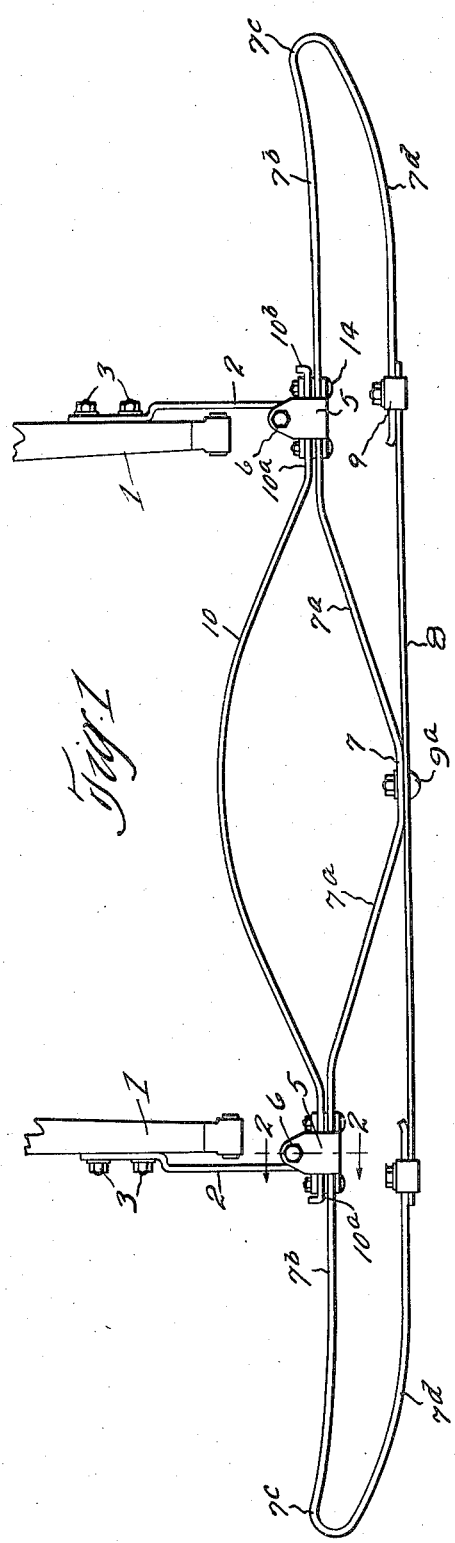
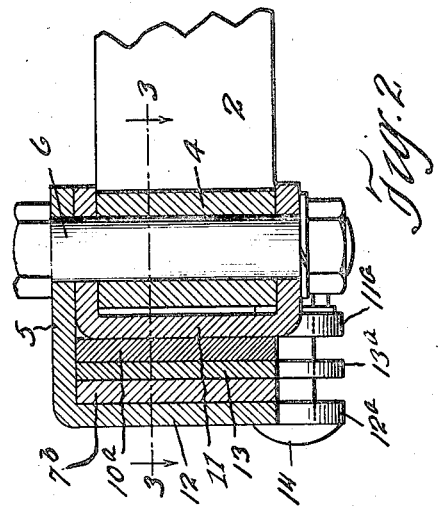
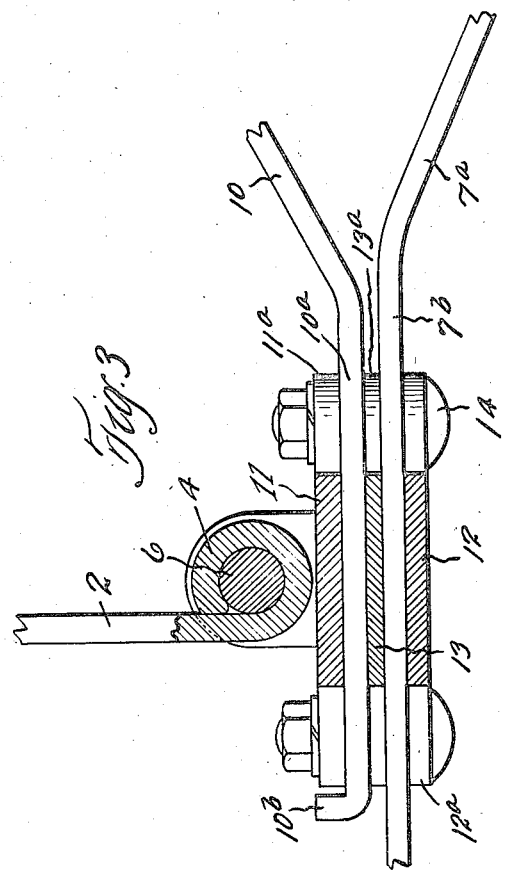
Inventor
Christian Girl,
By Hull, Buck & West,
Attys.

Patented Aug. 11, 1925.

1,549,108

UNITED STATES PATENT OFFICE.

CHRISTIAN GIRL, OF KALAMAZOO, MICHIGAN, ASSIGNOR TO THE C. G. SPRING & BUMPER COMPANY, OF DETROIT, MICHIGAN, A CORPORATION OF DELAWARE.

BUMPER.

Application filed November 23, 1922. Serial No. 602,682.

*To all whom it may concern:*

Be it known that I, CHRISTIAN GIRL, a citizen of the United States, residing at Kalamazoo, in the county of Kalamazoo and State of Michigan, have invented a certain new and useful Improvement in Bumpers, of which the following is a full, clear, and exact description, reference being had to the accompanying drawings.

This invention relates to bumpers for automobiles and similar vehicles and has for its general object to provide a bumper of this character which is particularly strong and which, under conditions of extreme deflection, will protect the radiator and other parts from injury.

In the drawings forming part hereof Fig. 1 represents a plan view of bumper constructed in accordance with my invention, showing the manner in which it is mounted upon the ends of a vehicle frame; Fig. 2 is a sectional detail corresponding to the line 2—2 of Fig. 1; and Fig. 3 a similar view corresponding to the line 3—3 of Fig. 2.

Describing the various parts herein by reference characters, 1 denotes the ends of the side members of an automobile and 2 the bumper supporting arms which are secured to such members, as by means of bolts 3, each of the arms having at its outer end an eye 4 by means of which it is pivotally connected to the clamping members (indicated generally at 5) which clamping members are in turn secured to the bumper. This pivotal connection is shown as effected by means of bolts 6.

The bumper shown herein comprises generally a rear bar (which is preferably of the flat plate type), the said bar extending continuously the full width of the bumper and having its ends bent forwardly into loops and spaced apart at the front or impact-receiving portion of the bumper. The central portion of the bar is preferably bent forward into, or substantially into, the plane of the ends of the front portion, as indicated at 7. From this centrally projected portion the rear bar is bent outwardly and rearwardly, as indicated at 7ª, thence outwardly, as indicated at 7ᵇ, the end portions then being bent first outwardly and then inwardly, as indicated at 7ᶜ and 7ᵈ, to form loops at opposite ends of the bumper. The opposite ends of the parts 7ᵈ are connected by a bar 8 which is shown as secured to such parts by means of suitable clamps, indicated at 9. The central portion of the bar or plate 8 is connected to the central portion 7 of the rear bar by any suitable clamping means, such as 9ª.

With bumpers of the resilient bar or plate type there is danger that, under severe deflection, the central portion between the supporting arms or brackets may be forced or driven rearwardly against the radiator (in the case of a front bumper) or forwardly against the gasoline tank or other parts to be protected by a rear bumper. Under such severe blows or deflections, any ordinary type of friction clamp cannot prevent the bar attached thereto from being dragged or moved through such clamp; in fact, such yielding at the clamp contributes to the protection of the automobile and its parts by the bumper, since it permits the bumper to yield sufficiently to accommodate a severe deflection without breakage.

In order to prevent injury of the radiator (in the case of a front bumper) and of the gasoline tank or other parts at the rear of a car (in the case of a rear bumper) I provide the bumper with a rear bar serving to operate as a positive stop against extreme deflection of the central portion of the bumper proper. In the drawings hereof, such a bar is indicated generally at 10, the said bar having its central portion bowed rearwardly, or toward the body of the vehicle, and its ends constructed and arranged to be attached to the portions 7ᵇ of the main bumper, the end portions 10ª of such reinforcing bar or plate being preferably parallel with the corresponding portions 7ᵇ of the main bumper and each end portion 10ª being provided with a projection 10ᵇ, preferably formed by bending the ends of the said bar at substantially right angles to the parts 10ª thereof.

The bumper is mounted upon the arms 2 by means of the clamps 5, which clamps are shown as securing together the parts 7ᵇ and 10ª. The clamps may be of any construction capable of being adjustably applied to the parts 10ª and 7ᵇ and of being pivotally connected to the arms 2 by means of the bolts 6, those shown herein being of the type disclosed and claimed in the patent of Wayne E. Dunston, granted May 1, 1923, No. 1,453,866. Each clamp shown herein comprises an inner channel-shaped member 11 which is adapted to extend above and below an eye 4 and to receive jointly with such eye one of the bolts 6. In addition, each clamp comprises an L-shaped member 12, the upper flange 5 of which overlaps the top of the upper branch of its channeled member 11 and also receives the bolts 6. Between the vertical portions of the members 11 and 12 there is provided a channeled seat for the reception of the rear portion 7$^b$ of the bumper, the end portion 10$^a$ of the bar 10, and a short spacing plate 13 interposed between the parts 11 and 12. The lower ends of the members 11 and 12 of each clamp and the lower end of the plate 13 are provided with lugs 11$^a$, 12$^a$ and 13$^a$, respectively, through which extend bolts 14, the said bolts clamping the lower ends of the parts 11, 12 and 13 together and also serving to retain the parts 10$^a$ and 7$^b$ in place.

It will be noted that, when the parts are assembled, the end projections 10$^b$ of the rear bar 10 extend a short distance beyond the outer ends of the clamping members 5. In practice this distance may be about half an inch.

With the parts constructed and arranged as described, the bumper comprising the parts 7—8 inclusive will function in the ordinary manner under blows or impacts received by the central portion thereof and which are not of such severity as to deflect such central portion into engagement with the part 10 of the reinforcing bar or plate. When the central portion of the bumper proper engages the part 10, the latter part will move rearwardly (or forwardly in the case of a rear bumper). Under a blow of sufficient severity to cause an ordinary bumper to endanger the radiator or gasoline tank the end portions 10$^a$ of the part 10 may be dragged through their clamps; but this dragging will be stopped as soon as the hooks or projections 10$^b$ engage the outer ends of the clamps. The auxiliary bar 10 will then serve as a positive stop to limit the dragging of the bumper parts through the clamps, and thereafter the blow will be taken entirely by the bumper, the auxiliary plate 10, arms 2 and frame members 1. Where the arms 2 are of resilient material, the auxiliary bar will be so shaped and proportioned that the central portion thereof will not impinge upon the radiator or tank when said arms are moved inwardly or toward each other to the maximum extent permitted by their length and by the limit of elasticity of the metal of which they are composed.

By mounting the auxiliary bar in the manner described, it constitutes a yieldable stop for the portion of the bumper which may contact therewith, and this yieldable feature enhances its value and efficiency in protecting the vehicle parts against injury.

While my invention is capable of use in connection with various forms of bumpers, its use in connection with a bumper of the type shown herein renders the bumper as a whole less liable to injury under impact and greatly enhances the protection afforded to a vehicle by the bumper and auxiliary bar 10. Because of the manner of constructing the bumper proper and pivotally mounting the same upon the arms 2, a blow delivered to any part of the bumper is transmitted throughout the whole extent of the latter. The pivotal connections enable the central portion of the bumper to yield under severe impact, the rear or auxiliary portion 7—7$^b$ resisting such yielding until the parts 7, 7$^a$ are reversely curved to an extent to enable them to engage the auxiliary bar 10, after which the three parts 8, 7, 7$^a$ and 10 all cooperate to protect the portion of the vehicle covered by the central part of the bumper.

Having thus described my invention, what I claim is:

1. The combination, with supporting members, of a bumper connected to and extending between said members, an auxiliary bar additional to said bumper located between the said bumper and the vehicle to which said members are attached and adapted to engage the portion of the bumper between said members when such portion is under severe deflection, and means frictionally engaging said auxiliary bar on opposite sides of its central portion, whereby the frictional drag of said bar will aid in checking the movement of the intermediate portions of the bumper and bar toward the vehicle.

2. The combination, with supporting members, of a bumper having a yieldable central portion supported by and between said members, and an auxiliary bar of resilient material supported by said members and having its central portion bowed away from the central portion of the bumper.

3. The combination, with a pair of bumper supporting members, of a resilient bumper connected to the said members, a resilient auxiliary bar located between the said bumper and the vehicle to which it is attached and arranged to be engaged by the central portion of said bumper under severe deflection, means movably supporting the said auxiliary bar, and stops for limiting the extent of the movement thereof.

4. The combination, with a pair of bumper supporting members, of a resilient bumper extending between and connected to said members, a yieldable member additional to said bumper interposed between the central portion of such bumper and the adjacent part of a vehicle and serving to limit the movement of such central portion of the bumper toward the said vehicle, and means yieldably engaging the said member.

5. The combination, with a pair of bumper supporting members, of a resilient bar bumper extending between and connected to said members, a resilient bar additional to said bumper interposed between the central portion of the said bumper and the portion of the vehicle protected thereby, and means engaging the last mentioned bar on opposite sides of the center thereof, at least one of such engaging means serving to exert a frictional drag upon said bar when the latter is engaged by the bumper bar.

6. The combination, with a pair of bumper supporting members, of a resilient bar bumper extending across and connected to the said members, an auxiliary bar interposed between the central portion of the said bumper and the portion of the vehicle to be protected thereby, the said auxiliary bar having its central portion deflected toward the vehicle, means movably supporting the said auxiliary bar, and stops for limiting the extent of movement of said bar.

7. The combination, with a pair of bumper supporting members, of a bumper comprising a front or impact section and an auxiliary section connected with the impact section, clamps for connecting the auxiliary section of the bumper to said members, an auxiliary bar having a movable connection with said clamps and having a central portion projected away from the central portion of said bumper, and means for limiting the movement of said bar with respect to the said clamps.

8. The combination, with a pair of bumper supporting members, of a bumper comprising a front or impact section and an auxiliary section connected at its ends with the ends of the impact section, clamps for connecting the auxiliary section of the bumper to said members, an auxiliary bar having a movable connection with said clamps and having a central portion normally spaced from the central portion of said bumper, and means for limiting the movement of said bar with respect to the said clamps.

9. The combination, with a pair of bumper supporting members, of a resilient bumper comprising a front or impact section and a rear or auxiliary section connected to the front section, clamps pivotally connecting the rear section to said members, an auxiliary bar having its central portion projected away from the central portion of the bumper and its ends slidably mounted in said clamps, and projections on said bar for limiting the sliding movement thereof with respect to said clamps.

10. The combination, with a pair of bumper supporting members, of a resilient bumper comprising a front or impact section and a rear or auxiliary section connected to the front section, means pivotally connecting the rear section to said members, an auxiliary bar extending across and spaced from the central portion of said auxiliary section, means yieldingly supporting the end portions of said bar, and means for limiting the extent of movement of said bar.

11. The combination, with a pair of bumper supporting members, of a bumper comprising a front or impact section and a rear or auxiliary section connected with the impact section, an auxiliary bar interposed between the central portion of the said bumper and the portion of the vehicle to be protected thereby, the said auxiliary bar having its central portion deflected toward the vehicle, means pivotally connecting the auxiliary section and the auxiliary bar to said members, said means permitting a sliding movement of the end portions of said bar, and stops for limiting the extent of such movement.

12. The combination, with a pair of bumper supporting members, of a bumper comprising a front or impact section and a rear or auxiliary section connected with the impact section and having its central portion projecting toward and connected to the central portion of the impact section, an auxiliary bar interposed between the central portion of the said bumper and the portion of the vehicle to be protected thereby, and means connecting the auxiliary section and the auxiliary bar to said members, the said means permitting a sliding movement of the end portions of said auxiliary bar.

13. The combination, with a pair of bumper supporting members, of a bumper comprising a front or impact section and a rear or auxiliary section connected with the impact section and having its central portion projecting toward and connected to the central portion of the impact section, an auxiliary bar interposed between the central portion of the said bumper and the portion of the vehicle to be protected thereby, the said auxiliary bar having its central portion deflected toward the vehicle, and means connecting the auxiliary section and the auxiliary bar to said members, the said means permitting a sliding movement of the end portions of said auxiliary bar.

14. The combination, with a pair of bumper supporting members, of a bumper comprising a front or impact section and a rear or auxiliary section connected with the impact section and having its central portion projecting toward and connected to the central portion of the impact section, an auxiliary bar interposed between the central portion of the said bumper and the portion of the vehicle to be protected thereby, means pivotally connecting the auxiliary section and the auxiliary bar to said members, the said means permitting a sliding movement of the end portions of said auxiliary bar, and stops for limiting the extent of such movement.

15. The combination, with a pair of bumper supporting members, of a bumper comprising a front or impact section and a rear or auxiliary section connected with the impact sections and having its central portion projecting toward and connected to the central portion of the impact section, an auxiliary bar interposed between the central portion of the said bumper and the portion of the vehicle to be protected thereby, the said auxiliary bar having its central portion deflected toward the vehicle, means pivotally connecting the auxiliary section and the auxiliary bar to said members, the said means permitting a sliding movement of the end portions of said auxiliary bar, and stops for limiting the extent of such movement.

In testimony whereof, I hereunto affix my signature.

CHRISTIAN GIRL.